US010032248B2

(12) United States Patent
Huang et al.

(10) Patent No.: US 10,032,248 B2
(45) Date of Patent: Jul. 24, 2018

(54) IMAGE SWITCHING METHOD AND APPARATUS

(71) Applicant: Huawei Technologies Co., Ltd., Shenzhen (CN)

(72) Inventors: Xueyan Huang, Shenzhen (CN); Peiyun Di, Shenzhen (CN); Heng Liao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 233 days.

(21) Appl. No.: 14/984,854

(22) Filed: Dec. 30, 2015

(65) Prior Publication Data

US 2016/0253777 A1   Sep. 1, 2016

(30) Foreign Application Priority Data

Feb. 26, 2015   (CN) .......................... 2015 1 0088822

(51) Int. Cl.
*G06F 3/01*   (2006.01)
*G06T 3/00*   (2006.01)
(Continued)

(52) U.S. Cl.
CPC ............ *G06T 3/0018* (2013.01); *G06F 3/013* (2013.01); *G06F 3/017* (2013.01); *G06F 3/0482* (2013.01); *G06F 3/04817* (2013.01); *G06F 3/04842* (2013.01); *G06F 3/04847* (2013.01); *G06F 3/04883* (2013.01); *G06F 3/167* (2013.01); *G09G 5/34* (2013.01); *H04N 5/23216* (2013.01); *H04N 5/23238* (2013.01);
(Continued)

(58) Field of Classification Search
CPC ....... G06T 3/0018; G06F 3/013; G06F 3/017; G06F 3/04817; G06F 3/0482; G06F 3/04842; G06F 3/04847; G06F 3/04883; G06F 3/167; G09G 5/34; H04N 5/23216; H04N 5/23238; H04N 5/23293
See application file for complete search history.

(56) References Cited

U.S. PATENT DOCUMENTS 8,032,843 B2   10/2011   Ording et al.
2009/0295818 A1*   12/2009   Jin ....................... G06T 3/0018
345/581
(Continued)

FOREIGN PATENT DOCUMENTS

CN   101504805 A   8/2009
CN   103765374 A   4/2014
(Continued)

*Primary Examiner* — Christopher Findley
(74) *Attorney, Agent, or Firm* — Leydig, Voit & Mayer, Ltd.

(57) ABSTRACT

An image switching method and apparatus. The method includes: displaying an image in a first format; receiving an input instruction for switching the image from the first format to a second format; and displaying the image in the second format. The first format is a panorama image format or a wide-view image format, the second format is a panorama image format or a wide-view image format, and the first format is different from the second format. According to the method and the device in the embodiments of the present invention, a manner of simple and flexible interaction between a panorama image and a street side image is provided.

25 Claims, 9 Drawing Sheets

(51) Int. Cl.
*G09G 5/34* (2006.01)
*H04N 5/232* (2006.01)
*G06F 3/0481* (2013.01)
*G06F 3/0482* (2013.01)
*G06F 3/0484* (2013.01)
*G06F 3/0488* (2013.01)
*G06F 3/16* (2006.01)

(52) U.S. Cl.
CPC . *H04N 5/23293* (2013.01); *G09G 2320/0261* (2013.01); *G09G 2340/14* (2013.01); *G09G 2354/00* (2013.01)

(56) References Cited

U.S. PATENT DOCUMENTS

| | | | |
|---|---|---|---|
| 2012/0105682 A1* | 5/2012 | Hata | H04N 5/23238 348/239 |
| 2012/0120187 A1* | 5/2012 | Goto | G03B 37/02 348/36 |
| 2012/0133639 A1 | 5/2012 | Kopf et al. | |
| 2012/0293607 A1 | 11/2012 | Bhogal et al. | |
| 2012/0293608 A1 | 11/2012 | Doepke et al. | |
| 2012/0293609 A1 | 11/2012 | Doepke et al. | |
| 2012/0294549 A1 | 11/2012 | Doepke | |
| 2013/0033566 A1* | 2/2013 | Sento | G03B 37/02 348/36 |
| 2013/0271454 A1 | 10/2013 | Lyons et al. | |
| 2013/0293488 A1* | 11/2013 | Na | G06F 3/013 345/173 |
| 2014/0375760 A1 | 12/2014 | Lee et al. | |

FOREIGN PATENT DOCUMENTS

CN 104301769 A 1/2015
WO WO 2016045381 A1 3/2016

* cited by examiner

IMAGE SWITCHING METHOD AND APPARATUS

CROSS-REFERENCE TO RELATED APPLICATION

This application claims priority to Chinese Patent Application No. 201510088822.4, filed on Feb. 26, 2015, which is hereby incorporated by reference in its entirety.

TECHNICAL FIELD

The present invention relates to the computer field, and provides an image switching method and device.

BACKGROUND

In an image presenting process, a panoramic camera can shoot a 360-degree panoramic video. A user can view 360-degree scenery around a point by watching the 360-degree panoramic video, and can also view street side scenery of an entire street by viewing a street side image. However, the user cannot switch from the 360-degree panoramic video to the street side image on the street side when watching the 360-degree panoramic video, or switch from a place that the user is interested in and is in the street side image to the 360-degree panoramic video when viewing the place that the user is interested in and is in the street side image.

SUMMARY

Embodiments of the present invention provide an image switching method and apparatus, so as to provide a simple and flexible manner of interaction between a panorama image and a street side image.

According to a first aspect, an embodiment of the present invention provides an image switching method, where the method includes: displaying an image in a first format; receiving an input instruction for switching the image from the first format to a second format; and displaying the image in the second format, where the first format is a panorama image format or a wide-view image format, the second format is a panorama image format or a wide-view image format, and the first format is different from the second format, where the panorama image is an effect image stitched by multiple images that are shot from different directions by simulating a shooting subject standing in a specific position, and the wide-view image is an effect image stitched by multiple sub-images of a side that are shot by simulating a shooting subject moving along a track.

In a first implementation form of the first aspect, before the receiving an instruction for switching the image from the first format to a second format, the method further includes: presenting an input identifier of a switching instruction for switching from the first format to the second format; and the receiving an input instruction for switching the image from the first format to a second format specifically includes: receiving a selecting operation on the input identifier of the switching instruction.

With reference to the first aspect or the first implementation manner of the first aspect, in a second implementation manner of the first aspect, before the presenting an input identifier of a switching instruction for switching from the first format to the second format, the method further includes: predicting whether a user is willing to switch the image from the first format to the second format; and the presenting an input identifier of a switching instruction for switching from the first format to the second format includes: if it is predicted that the user is willing to switch the image from the first format to the second format, presenting the input identifier of the switching instruction for switching from the first format to the second format.

With reference to the first aspect or either one of the foregoing implementation manners of the first aspect, in a third implementation manner of the first aspect, the wide-view image is an effect image stitched by multiple sub-images, of one side of a road, that are shot by simulating a shooting subject moving along the road.

With reference to the first aspect or any one of the foregoing implementation manners of the first aspect, in a fourth implementation manner of the first aspect, the predicting that the user is willing to switch the image from the first format to the second format includes: if an eyesight-gaze position of the user moves in a street side direction, or an operating focus moves in a street side direction, predicting that the user is willing to switch the image from the first format to the second format, where the first format is the panorama image format, and the second format is the wide-view image format.

With reference to the first aspect or any one of the foregoing implementation manners of the first aspect, in a fifth implementation manner of the first aspect, the wide-view image is an effect image stitched by multiple sub-images, of a side of an object, that are shot by simulating a shooting subject moving around the object.

With reference to the first aspect or any one of the foregoing implementation manners of the first aspect, in a sixth implementation manner of the first aspect, the predicting that the user is willing to switch the image from the first format to the second format includes: if a time for which an eyesight-gaze position of the user stays on an object of the image exceeds a preset time, or a time for which an operating focus stays on an object of the image exceeds a preset time, predicting that the user is willing to switch the image from the first format to the second format, where the first format is the panorama image format, and the second format is the wide-view image format.

With reference to the first aspect or any one of the foregoing implementation manners of the first aspect, in a seventh implementation manner of the first aspect, the predicting that the user is willing to switch the image from the first format to the second format includes: identifying content of the displayed image, so as to predict that the user is willing to switch the image from the first format to the second format.

With reference to the first aspect or any one of the foregoing implementation manners of the first aspect, in an eighth implementation manner of the first aspect, the presenting an input identifier of a switching instruction for switching from the first format to the second format includes: presenting an icon of the switching instruction for switching from the first format to the second format; and the receiving an input instruction for switching the image from the first format to a second format includes: receiving a click operation on the icon of the switching indication.

With reference to the first aspect or any one of the foregoing implementation manners of the first aspect, in a ninth implementation manner of the first aspect, the presenting an input identifier of a switching instruction for switching from the first format to the second format includes: presenting a text prompt for switching from the first format to the second format; and the receiving an input instruction for switching the image from the first format to a second format includes: receiving a click operation on the text prompt.

With reference to the first aspect or any one of the foregoing implementation manners of the first aspect, in a tenth implementation manner of the first aspect, the presenting an input identifier of a switching instruction for switching from the first format to the second format includes: presenting a menu option for switching from the first format to the second format; and the receiving an input instruction for switching the image from the first format to a second format includes: receiving a click operation on the menu option.

With reference to the first aspect or any one of the foregoing implementation manners of the first aspect, in an eleventh implementation manner of the first aspect, the receiving an input instruction for switching the image from the first format to a second format includes: receiving a gesture instruction for switching the image from the first format to the second format.

With reference to the first aspect or any one of the foregoing implementation manners of the first aspect, in a twelfth implementation manner of the first aspect, the receiving an input instruction for switching the image from the first format to a second format includes: receiving a voice instruction for switching the image from the first format to the second format.

According to a second aspect, an embodiment of the present invention provides an image switching apparatus, where the apparatus includes: a display module and a switching instruction receiving module, where the display module is configured to display an image in a first format, the switching instruction receiving module is configured to receive an input instruction for switching the image from the first format to a second format, and the display module is further configured to display the image in the second format, where the first format is a panorama image format or a wide-view image format, the second format is a panorama image format or a wide-view image format, and the first format is different from the second format, where the panorama image is an effect image stitched by multiple images that are shot from different directions by simulating a shooting subject standing in a specific position, and the wide-view image is an effect image stitched by multiple sub-images of a side that are shot by simulating a shooting subject moving along a track.

In a first implementation form of the second aspect, the apparatus further includes: a switching identifier presenting module; and before the instruction for switching the image from the first format to the second format is received, the switching identifier presenting module is configured to present an input identifier of a switching instruction for switching from the first format to the second format, and the switching instruction receiving module is configured to receive a selecting operation on the input identifier of the switching instruction.

With reference to the second aspect or the first implementation manner of the second aspect, in a second implementation manner of the second aspect, the apparatus further includes a predicting module; and before the input identifier of the switching instruction for switching from the first format to the second format is presented, the predicting module is configured to predict whether a user is willing to switch the image from the first format to the second format, and if it is predicted that the user is willing to switch the image from the first format to the second format, the switching identifier presenting module is configured to present the input identifier of the switching instruction for switching from the first format to the second format.

With reference to the second aspect or any one of the foregoing implementation manners of the second aspect, in a third implementation manner of the second aspect, the wide-view image is an effect image stitched by multiple sub-images, of one side of a road, that are shot by simulating a shooting subject moving along the road.

With reference to the second aspect or any one of the foregoing implementation manners of the second aspect, in a fourth implementation manner of the second aspect, if an eyesight-gaze position of the user moves in a street side direction, or an operating focus moves in a street side direction, the predicting module is configured to predict that the user is willing to switch the image from the first format to the second format, where the first format is the panorama image format, and the second format is the wide-view image format.

With reference to the second aspect or any one of the foregoing implementation manners of the second aspect, in a fifth implementation manner of the second aspect, the wide-view image is an effect image stitched by multiple sub-images, of a side of an object, that are shot by simulating a shooting subject moving around the object.

With reference to the second aspect or any one of the foregoing implementation manners of the second aspect, in a sixth implementation manner of the second aspect, if a time for which an eyesight-gaze position of the user stays on an object of the image exceeds a preset time, or a time for which an operating focus stays on an object of the image exceeds a preset time, the predicting module is configured to predict that the user is willing to switch the image from the first format to the second format, where the first format is the panorama image format, and the second format is the wide-view image format.

With reference to the second aspect or any one of the foregoing implementation manners of the second aspect, in a seventh implementation manner of the second aspect, the predicting module is configured to identify content of the displayed image, so as to predict that the user is willing to switch the image from the first image to the second image.

With reference to the second aspect or any one of the foregoing implementation manners of the second aspect, in an eighth implementation manner of the second aspect, the switching identifier presenting module is configured to present an icon of the switching instruction for switching from the first format to the second format, and the switching instruction receiving module is configured to receive a click operation on the icon of the switching indication.

With reference to the second aspect or any one of the foregoing implementation manners of the second aspect, in a ninth implementation manner of the second aspect, the switching identifier presenting module is configured to present a text prompt for switching from the first format to the second format, and the switching instruction receiving module is configured to receive a click operation on the text prompt.

With reference to the second aspect or any one of the foregoing implementation manners of the second aspect, in a tenth implementation manner of the second aspect, the switching identifier presenting module is configured to present a menu option for switching from the first format to the second format, and the switching instruction receiving module is configured to receive a click operation on the menu option.

With reference to the second aspect or any one of the foregoing implementation manners of the second aspect, in an eleventh implementation manner of the second aspect, the switching instruction receiving module is configured to receive a gesture instruction for switching the image from the first format to the second format.

With reference to the second aspect or any one of the foregoing implementation manners of the second aspect, in a twelfth implementation manner of the second aspect, the switching instruction receiving module is configured to receive a voice instruction for switching the image from the first format to the second format.

The embodiments of the present invention provide an image switching method, where the method includes: displaying an image in a first format; receiving an input instruction for switching the image from the first format to a second format; and displaying the image in the second format, where the first format is a panorama image format or a wide-view image format, the second format is a panorama image format or a wide-view image format, and the first format is different from the second format. A simple and flexible manner of switching between an effect image stitched by multiple images that are shot from different directions by a shooting subject standing in a specific position, and an effect image stitched by multiple sub-images of a side that are shot by a shooting subject when moving along a track is provided.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

EMBODIMENTS OF PRESENT INVENTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
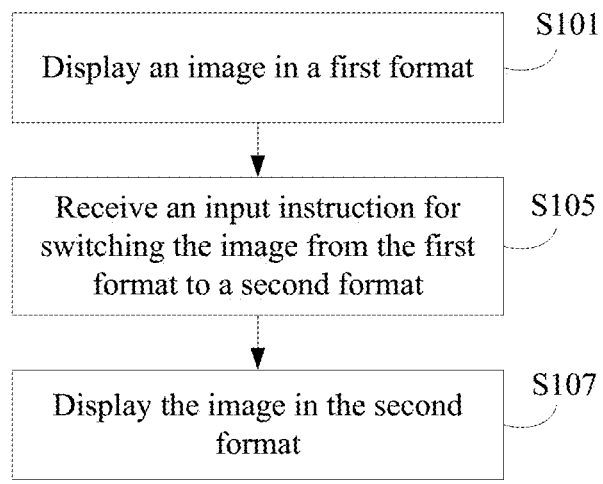
FIG. 1 is a flowchart of an embodiment of an image switching method according to the present invention.

An embodiment of the present invention provides an image switching method, and as shown in FIG. 1, FIG. 1 provides a flowchart of an embodiment of an image switching method according to the present invention. The method includes: S101. Display an image in a first format; S105. Receive an input instruction for switching the image from the first format to a second format; and S107. Display the image in the second format. The first format is a panorama image format or a wide-view image format, the second format is a panorama image format or a wide-view image format, and the first format is different from the second format. The panorama image is an effect image stitched by multiple images that are shot from different directions by simulating a shooting subject standing in a specific position, and the wide-view image is an effect image stitched by multiple sub-images of a side that are shot by simulating a shooting subject moving along a track. In the method provided in this embodiment of the present invention, a simple and flexible manner of switching between the panorama image and the wide-view image is provided.

Figure 2A:
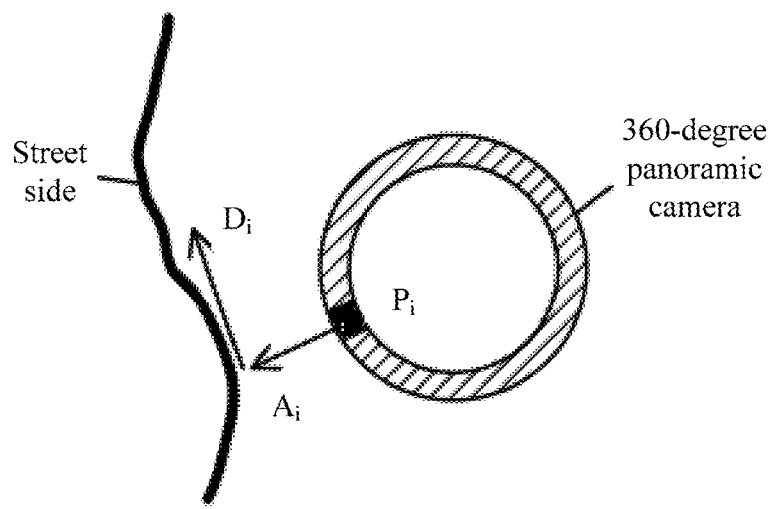
FIG. 2a is an example of a panorama image according to an embodiment of the present invention.
Figure 2B:
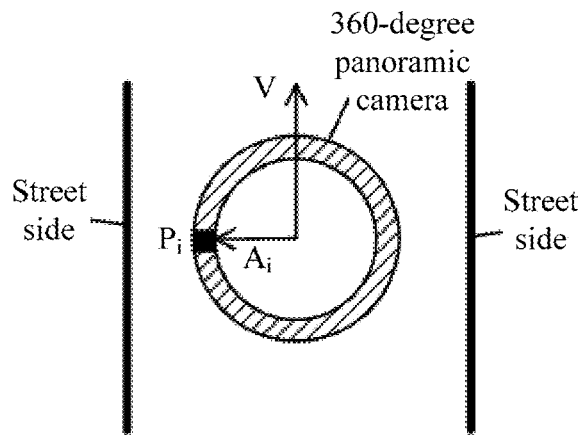
FIG. 2b is an example of a wide-view image according to an embodiment of the present invention.

As shown in FIG. 2, FIG. 2a and FIG. 2b respectively provide an example of a panorama image and an example of a wide-view image. An effect of the panorama image is consistent with an effect of viewing in different directions by a user in a position, and an effect of the wide-view image is consistent with an effect of stitching multiple front sub-images that are shot by a user when moving along a track. For example, the user separately collects different images at equidistant points of the track, separately cuts very-middle-part images from multiple images, and stitches multiple very-middle-part images to generate the wide-view image.

The panorama image and the wide-view image are respectively corresponding to a user's two common image viewing requirements.

In this embodiment, a process of generating the wide-view image is as follows: The wide-view image includes multiple front sub-images used to display a first area, and an $i^{th}$ front sub-image of the multiple front sub-images is corresponding to a front image that is used to display an $i^{th}$ subarea in the first area and is in a $j^{th}$ panorama image of multiple panorama images, where the $j^{th}$ panorama image is one of the multiple 360-degree panorama images, and i and j are positive integers. For example, for a navigation image or map information, the street side direction Di is determined, and then a direction Ai perpendicular to the street side direction Di is determined, as shown in FIG. 2a. Optionally, when a panoramic camera moves along the street side direction, as shown in FIG. 2b, a direction Ai perpendicular to a motion direction V of the panoramic camera is determined.

In an embodiment of the present invention, the panorama image includes a hexahedron panorama image, a columnar panorama image, a 4Pi panorama image, or the like. The hexahedron panorama image is a panorama image formed by stitching six images that are shot from six different directions by a user standing in a specific position and rotating for a circle, excluding front images of the sky and the ground, where the six different shooting directions may have equal-angle intervals or unequal-angle intervals. The columnar panorama image is a panorama image formed by stitching multiple images that are shot from multiple different directions by a user standing in a specific position and rotating for a circle, where the different shooting directions may have equal-angle intervals or unequal-angle intervals. The 4Pi panorama image is a panorama image stitched by multiple images that are shot from different directions by a user standing in a specific position, including any direction such as the sky, ground, front, back, left, and right directions.

Figure 3:
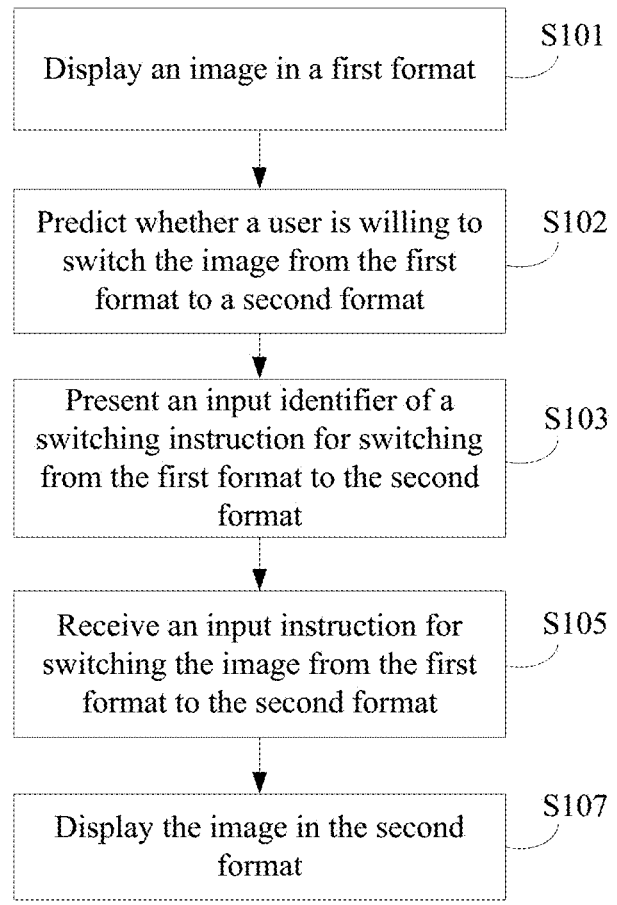
FIG. 3 is a flowchart of another embodiment of an image switching method according to the present invention.

In an embodiment of the present invention, before the receiving an instruction for switching the image from the first format to a second format, as shown in FIG. 3, FIG. 3 is a flowchart of an embodiment of an image switching method according to the present invention. The method further includes: S103. Present an input identifier of a switching instruction for switching from the first format to the second format.

In an embodiment of the present invention, before the presenting an input identifier of a switching instruction for switching from the first format to the second format, as shown in FIG. 3, FIG. 3 is a flowchart of an embodiment of an image switching method according to the present invention. The method further includes: S102. Predict whether a user is willing to switch the image from the first format to the second format. The presenting an input identifier of a switching instruction for switching from the first format to the second format includes: if it is predicted that the user is willing to switch the image from the first format to the second format, presenting the input identifier of the switching instruction for switching from the first format to the second format, where the first format is a panorama image format, and the second format is a wide-view image format; or the first format is a wide-view image format, and the second format is a panorama image format.

In an embodiment of the present invention, the wide-view image is an effect image stitched by multiple sub-images, of one side of a road, that are shot by simulating a shooting subject moving along the road. According to the method provided in this embodiment of the present invention, the wide-view image makes it convenient for a user to more clearly view details on one side of the road.

In an embodiment of the present invention, as shown in FIG. 3, FIG. 3 is a flowchart of an embodiment of an image switching method according to the present invention. S102 of the predicting that a user is willing to switch the image from the first format to the second format includes: if an eyesight-gaze position of the user moves in a street side direction, or an operating focus moves in a street side direction, predicting that the user is willing to switch the image from the first format to the second format, where the first format is the panorama image format, and the second format is the wide-view image format. The operating focus includes manners such as a mouse and a touch point. According to the method provided in this embodiment of the present invention, if the eyesight-gaze position of the user moves in the street side direction, or the operating focus moves in the street side direction, it indicates that the user is interested in an object on a street side. An effect image stitched by multiple sub-images of a street side that are shot by a shooting subject when moving along the street may be simulated by using the wide-view image, making it more convenient for the user to view an object on the street side.

In an embodiment of the present invention, the wide-view image is an effect image stitched by multiple sub-images of an object that are shot by simulating a shooting subject moving around the object. According to the method provided in this embodiment of the present invention, the wide-view image makes it convenient for a user to more clearly view a specific object, such as a building and a tree.

In an embodiment of the present invention, S102 of the predicting that a user is willing to switch the image from the first format to the second format includes: if a time for which an eyesight-gaze position of the user stays on an object of the image exceeds a preset time, or a time for which an operating focus stays on an object of the image exceeds a preset time, predicting that the user is willing to switch the image from the first format to the second format, where the first format is the panorama image format, and the second format is the wide-view image format. The operating focus includes manners such as a mouse and a touch point. If a time for which the eyesight-gaze position of the user stays on an object of the image exceeds the preset time, or a time for which the operating focus stays on an object of the image exceeds the preset time, it indicates that the user is interested in the object of the image. An effect image stitched by multiple sub-images of a side of an object that are shot by a shooting subject when moving around the object in the image may be simulated by using the wide-view image, making it more convenient for the user to view a lateral view around the object in the image. Determining that a time for which the eyesight-gaze position of the user stays on an object of the image exceeds the preset time, or a time for which the operating focus stays on an object of the image exceeds the preset time may be implemented by means of image content identification.

In an embodiment of the present invention, S102 of the predicting that a user is willing to switch the image from the first format to the second format includes: identifying content of the displayed image, so as to predict that the user is willing to switch the image from the first format to the second format, where the first format is the panorama image format, and the second format is the wide-view image format. The operating focus includes manners such as a mouse and a touch point, and if the content of the displayed image is identified, it indicates that the displayed image is a street side image. For an eyesight-gaze position of the user, an eye tracker or a similar apparatus is used to capture a gaze direction and an eye position, and to further calculate a gaze point of the user in an image plane. A street side direction is a street direction or a direction whose difference from the street direction is within a preset threshold range, where a preset threshold is determined by the user, such as 10 degrees and 20 degrees; and if a street is in a curved shape, a tangential direction of an operation or a gaze location point on the street in the curved shape is used as a street side direction. If the operating focus or the eyesight-gaze position of the user moves in the street side direction, it indicates that the user is interested in an object on the street side, and an effect image stitched by multiple sub-images of a street side that are shot by a shooting subject when moving along the street may be simulated by using the wide-view image, making it more convenient for the user to view the object on the street side. If the content of the displayed image is identified, and it shows that the displayed image is corresponding to an object, it indicates that the user is interested in an object of the image. An effect image stitched by multiple sub-images of a street side that are shot by a shooting subject when moving around an object in the image may be simulated by using the wide-view image, making it more convenient for the user to view a lateral view around the object in the image.

In an embodiment of the present invention, before the presenting an input identifier of a switching instruction for switching from the first format to the second format, the predicting whether a user is willing to switch the image from the first format to the second format includes: predicting that the user is willing to switch the image from the first format to the second format at any time.

Figure 4A:
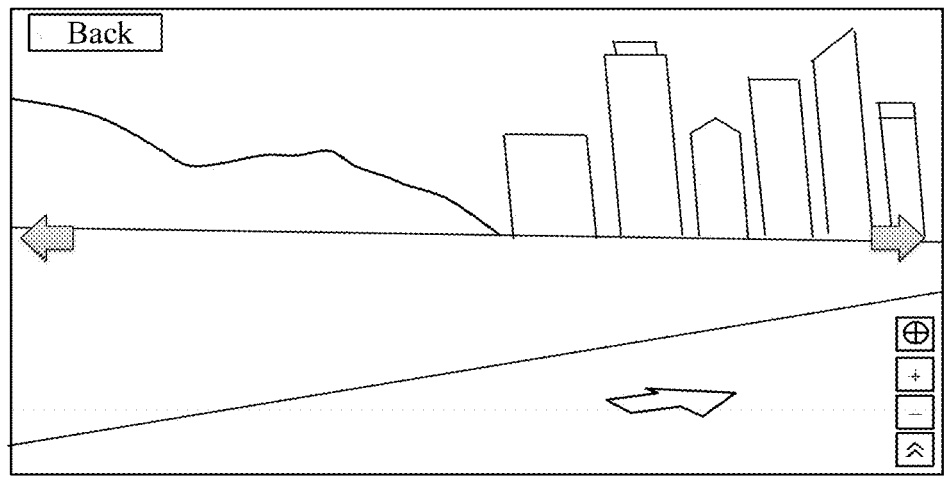
FIG. 4a is a schematic diagram of an embodiment of a switching indication arrow icon according to the present invention.
Figure 4B:
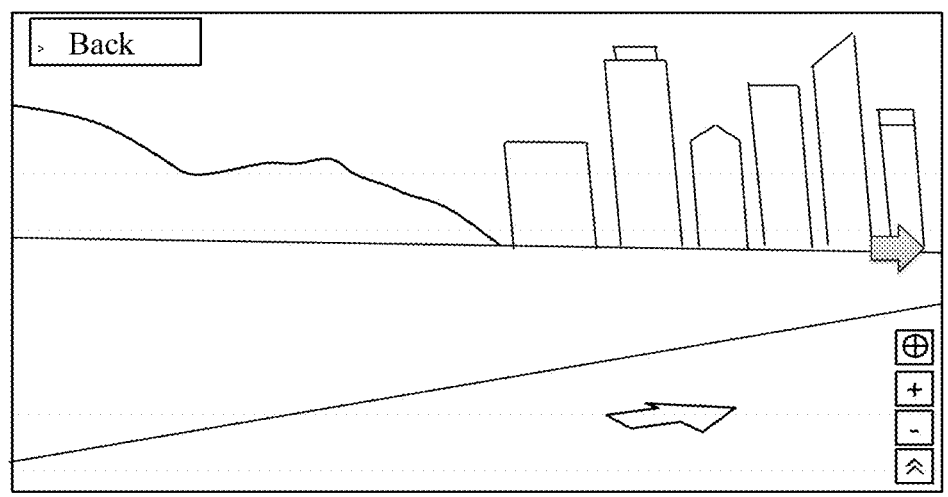
FIG. 4b is a schematic diagram of another embodiment of a switching indication arrow icon according to the present invention.
Figure 4C:
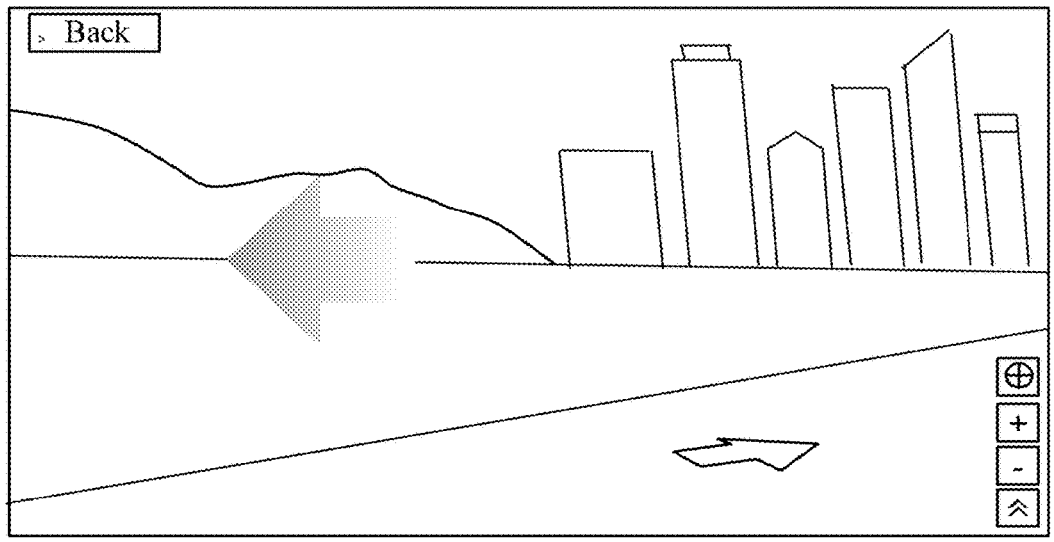
FIG. 4c is a schematic diagram of still another embodiment of a switching indication arrow icon according to the present invention.
Figure 4D:
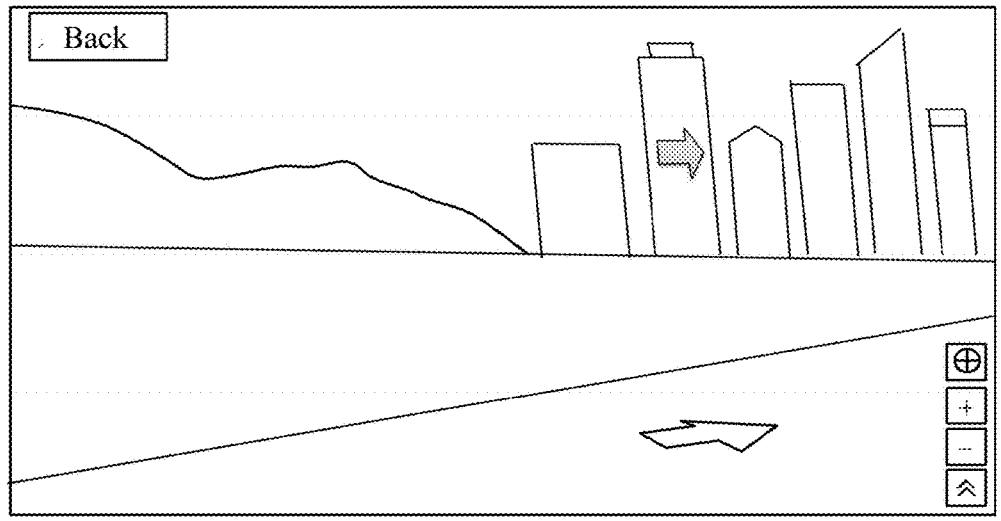
FIG. 4d is a schematic diagram of yet another embodiment of a switching indication arrow icon according to the present invention.

In an embodiment of the present invention, an interface presenting diagram of an embodiment of an image switching method according to the present invention is provided. The presenting an input identifier of a switching instruction for switching from the first format to the second format includes: presenting an icon of the switching instruction for switching from the first format to the second format; and the receiving an input instruction for switching the image from the first format to a second format includes: receiving a click operation on the icon of the switching indication. In an embodiment of the present invention, the icon of the switching indication is preferably an arrow, as shown in FIG. 4a, FIG. 4b, and FIG. 4c. The arrow may be located in any position of the figures, for example, in a street side direction or in a middle direction of a horizontal line of a figure, indicating that the image is expanded into a wide-view image of the street side, and a display manner of the arrow is not limited to manners shown in FIG. 4a, FIG. 4b, and FIG. 4c; or as shown in FIG. 4d, the arrow may be located on an object of the image, indicating that the image is switched to an expanded wide-view image of the object; or an icon shown in the bottom right corner of FIG. 4a is used as an icon of a switching instruction, and the icon of the switching instruction is not limited to the icon shown in the figure and may be designed in any form.

Figure 5:
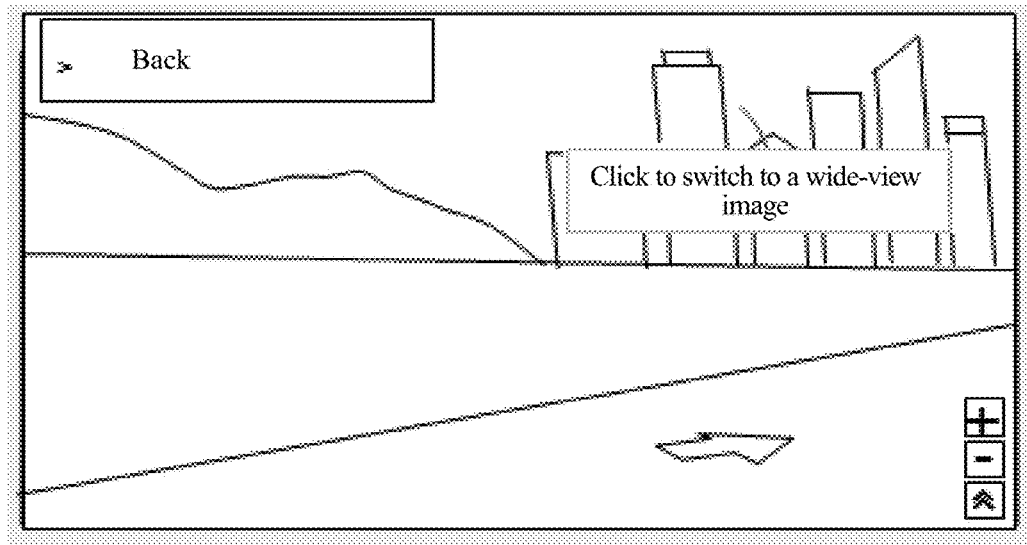
FIG. 5 is an interface presenting diagram of an embodiment of an image switching method according to the present invention.

In an embodiment of the present invention, as shown in FIG. 5, FIG. 5 provides an interface presenting diagram of an embodiment of an image switching method according to the present invention. The presenting an input identifier of a switching instruction for switching from the first format to the second format includes: presenting a text prompt for switching from the first format to the second format; and the receiving an input instruction for switching the image from the first format to a second format includes: receiving a click operation on the text prompt.

In an embodiment of the present invention, the presenting an input identifier of a switching instruction for switching from the first format to the second format includes: presenting a menu option for switching from the first format to the second format; and the receiving an input instruction for switching the image from the first format to a second format includes: receiving a click operation on the menu option. The method provided in this embodiment of the present invention is easy to operate and has good interactivity.

In an embodiment of the present invention, the receiving an input instruction for switching the image from the first format to a second format includes: receiving a gesture instruction for switching the image from the first format to the second format. As shown in FIG. 6, FIG. 6 provides a diagram of a gesture instruction for switching an image from a first format to a second format.

Indicating the gesture instruction for switching from the first format to the second format is determined in a preset manner. As shown in FIG. 6a, FIG. 6b, FIG. 6c, and FIG. 6d, a gesture for switching the panorama image to the wide-view image is defined as a gesture of gradually expanding a distance between two fingers, indicating that an image format is switched from the panorama image format to the wide-view image format; or a gesture for switching the wide-view image to the panorama image is defined as a gesture of gradually narrowing a distance between two fingers, indicating that an image format is switched from the wide-view image format to the panorama image format. Alternatively, as shown in FIG. 6e, a gesture that one or more fingers move in parallel in a street direction indicates that an image format is switched from the panorama image format to a wide-view image format for a road side, and in a preferred embodiment, two fingers may be selected; or an operation for selecting an object in the image indicates that an image format is switched from the panorama image format to a wide-view image format open for one side of the object. Alternatively, as shown in FIG. 6f, a gesture for horizontally moving an image display device indicates that an image format is switched from the panorama image format to the wide-view image format. A gesture may be set in any manner, which is not limited to the foregoing manners, provided that a user can easily understand the gesture.

Figure 6A:
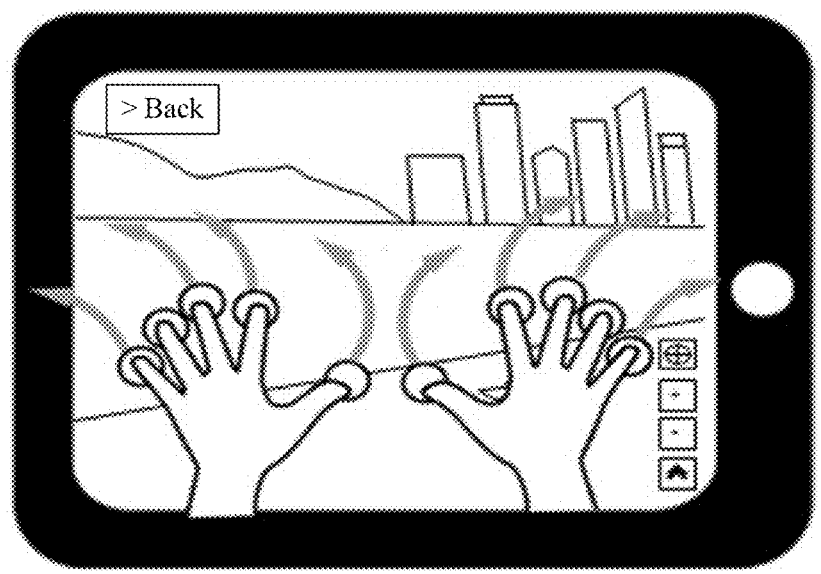
FIG. 6a is a schematic diagram of a gesture space expanding instruction according to an embodiment of the present invention.
Figure 6B:
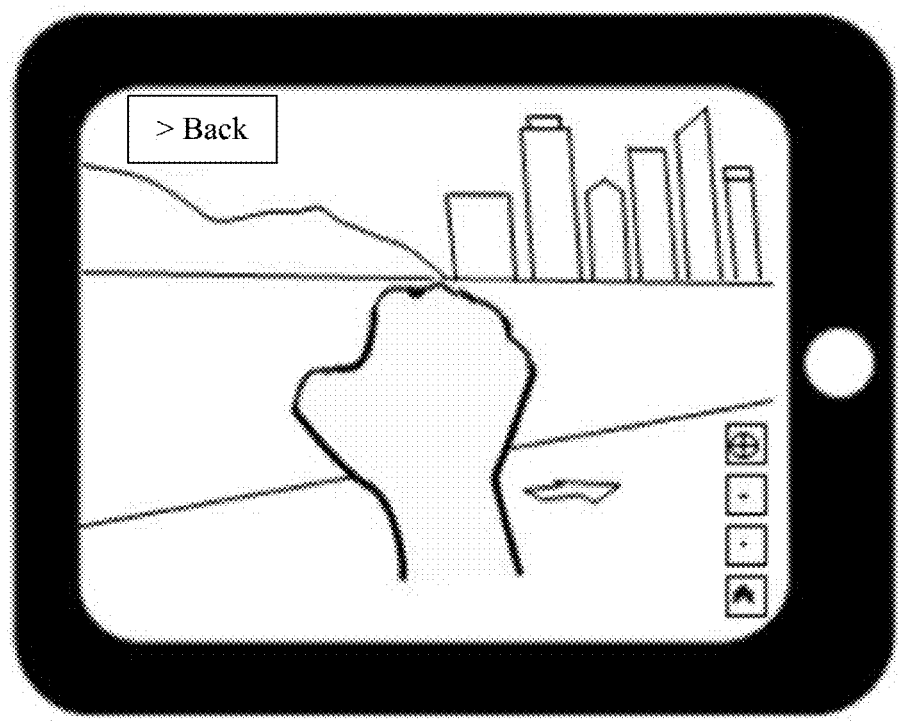
FIG. 6b is a schematic diagram of another embodiment of a gesture space expanding instruction according to the present invention.
Figure 6C:
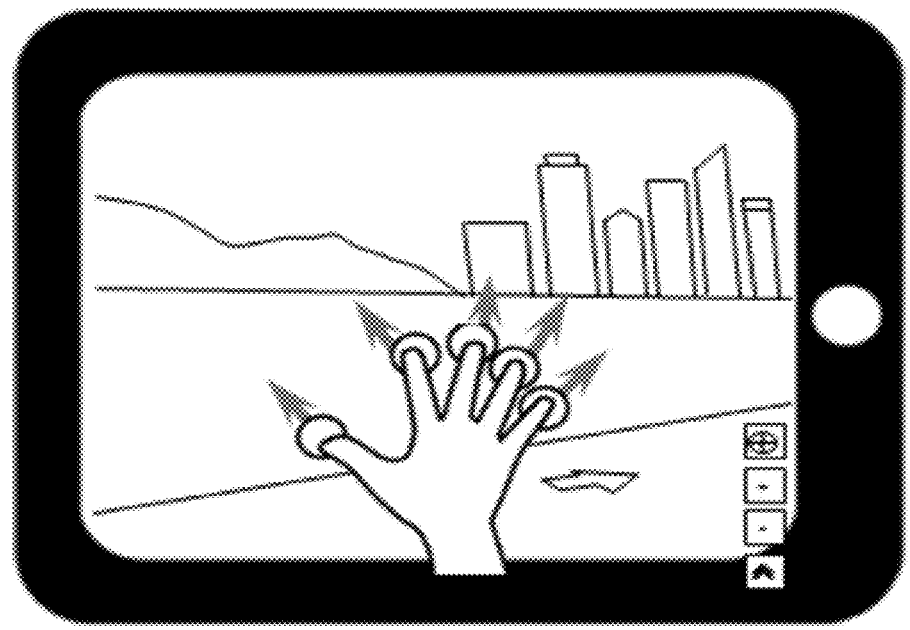
FIG. 6c is a schematic diagram of still another embodiment of a gesture space expanding instruction according to the present invention.
Figure 6D:
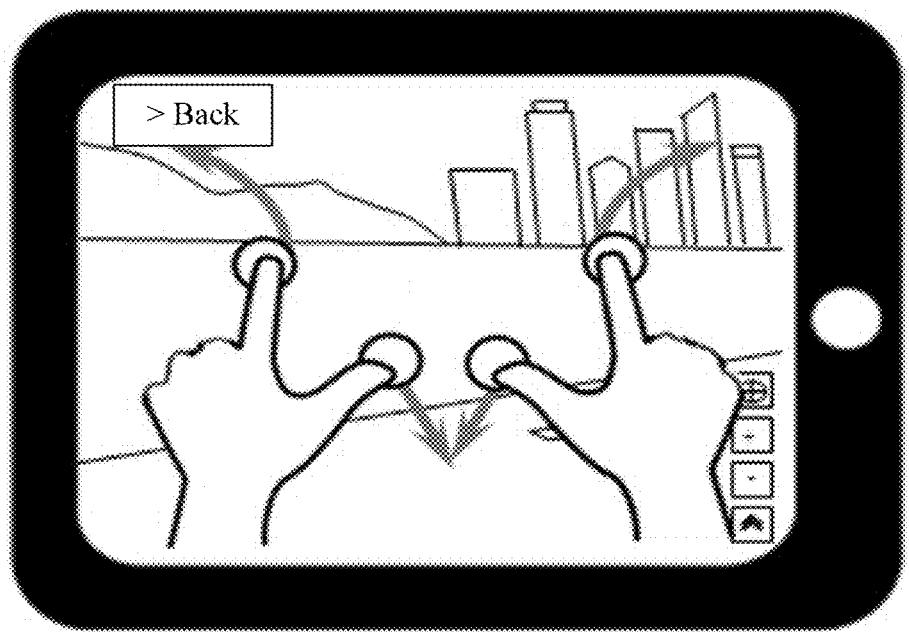
FIG. 6d is a schematic diagram of yet another embodiment of a gesture space expanding instruction according to the present invention.
Figure 6E:
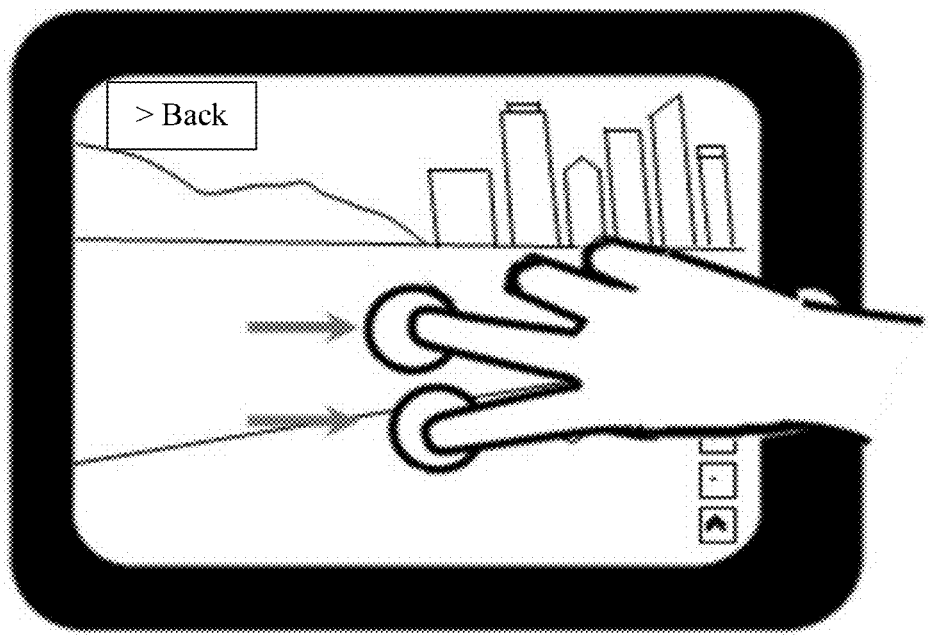
FIG. 6e is a schematic diagram of a gesture parallel moving instruction according to an embodiment of the present invention.
Figure 6F:
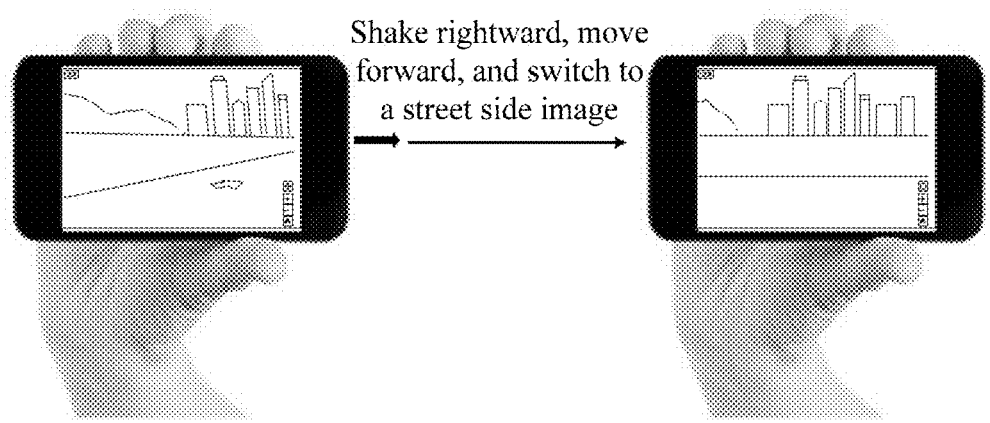
FIG. 6f is a schematic diagram of a device horizontal moving gesture according to the present invention.

In an embodiment of the present invention, that a gesture for switching the panorama image to the wide-view image is defined as a gesture of gradually expanding a distance between two fingers includes: that at least four touch points continuously move more than a distance along a path from a center to an outside, as shown in FIG. 6a (or non-touch gesture operation device, such as kinnect); or as shown in FIG. 6c, that more than four start operation points continuously move more than a distance along a path from a center to an outside.

In an embodiment of the present invention, the receiving an input instruction for switching the image from the first format to a second format includes: receiving a voice instruction for switching the image from the first format to the second format.

Figure 7:
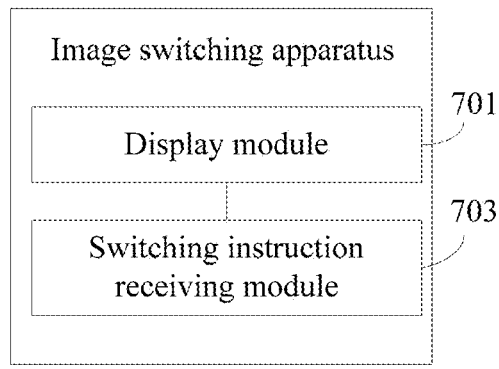
FIG. 7 is a structural diagram of an embodiment of an image switching apparatus according to the present invention.

An embodiment of the present invention provides an image switching apparatus. As shown in FIG. 7, FIG. 7 provides a structural diagram of an embodiment of the present invention. The apparatus includes: a display module 701 and a switching instruction receiving module 703, where the display module 701 is configured to display an image in a first format, the switching instruction receiving module 703 is configured to receive an input instruction for switching the image from the first format to a second format, and the display module 701 is further configured to display the image in the second format, where the first format is a panorama image format or a wide-view image format, the second format is a panorama image format or a wide-view image format, and the first format is different from the second format, where the panorama image is an effect image stitched by multiple images that are shot from different directions by simulating a shooting subject standing in a specific position, and the wide-view image is an effect image stitched by multiple sub-images of a side that are shot by simulating a shooting subject moving along a track.

Figure 8:
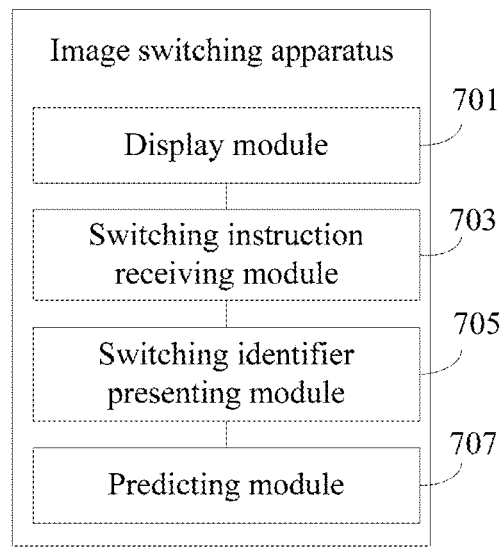
FIG. 8 is a structural diagram of another embodiment of an image switching apparatus according to the present invention.

In an embodiment of the present invention, as shown in FIG. 8, FIG. 8 provides a structural diagram of an embodiment of an image switching apparatus according to the present invention. The apparatus further includes: a switching identifier presenting module 705; and before the instruction for switching the image from the first format to the second format is received, the switching identifier presenting module 705 is configured to present an input identifier of a switching instruction for switching from the first format to the second format, and the switching instruction receiving module 703 is configured to receive a selecting operation on the input identifier of the switching instruction.

In an embodiment of the present invention, as shown in FIG. 8, the apparatus further includes a predicting module 707; and before the input identifier of the switching instruction for switching from the first format to the second format is presented, the predicting module 707 is configured to predict whether a user is willing to switch the image from the first format to the second format, and if it is predicted that the user is willing to switch the image from the first format to the second format, the switching identifier presenting module 705 is configured to present the input identifier of the switching instruction for switching from the first format to the second format.

In an embodiment of the present invention, the wide-view image is an effect image stitched by multiple sub-images, of one side of a road, that are shot by simulating a shooting subject moving along the road.

In an embodiment of the present invention, if an eyesight-gaze position of the user moves in a street side direction, or an operating focus moves in a street side direction, the predicting module 707 is configured to predict that the user is willing to switch the image from the first format to the second format, where the first format is the panorama image format, and the second format is the wide-view image format.

In an embodiment of the present invention, the wide-view image is an effect image stitched by multiple sub-images, of a side of an object, that are shot by simulating a shooting subject moving around the object.

In an embodiment of the present invention, if a time for which an eyesight-gaze position of the user stays on an object of the image exceeds a preset time, or a time for which an operating focus stays on an object of the image exceeds a preset time, the predicting module 707 is configured to predict that the user is willing to switch the image from the first format to the second format, where the first format is the panorama image format, and the second format is the wide-view image format.

In an embodiment of the present invention, the predicting module 707 is configured to identify content of the displayed image, so as to predict that the user is willing to switch the image from the first format to the second format.

In an embodiment of the present invention, the switching identifier presenting module 705 is configured to present an icon of the switching instruction for switching from the first format to the second format, and the switching instruction receiving module 703 is configured to receive a click operation on the icon of the switching indication.

In an embodiment of the present invention, the switching identifier presenting module 705 is configured to present a text prompt for switching from the first format to the second format, and the switching instruction receiving module 703 is configured to receive a click operation on the text prompt.

In an embodiment of the present invention, the switching identifier presenting module 705 is configured to present a menu option for switching from the first format to the second format, and the switching instruction receiving module 703 is configured to receive a click operation on the menu option.

In an embodiment of the present invention, the switching instruction receiving module 703 is configured to receive a gesture instruction for switching the image from the first format to the second format.

In an embodiment of the present invention, the switching instruction receiving module 703 is configured to receive a voice instruction for switching the image from the first format to the second format.

Figure 9:
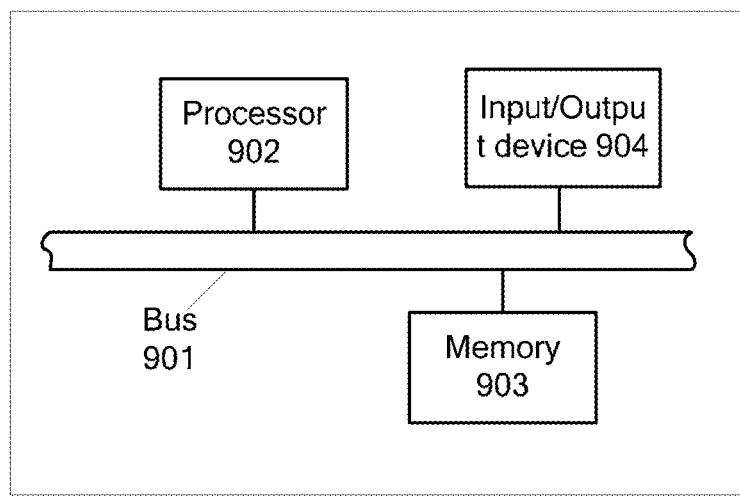
FIG. 9 is a structural diagram of an embodiment of an image switching computer system according to the present invention.

An embodiment of the present invention provides a computer system for image switching. As shown in FIG. 9, the computer system includes a bus 901, a processor 902, a memory 903, and an input/output device 904. The processor, the memory, and the input/output device are connected by using the bus. The memory is configured to store data and code, and the processor is coupled to the memory, so as to invoke the data and the code of the memory to implement the following method: displaying an image in a first format; receiving an input instruction for switching the image from the first format to a second format; and displaying the image in the second format, where the first format is a panorama image format or a wide-view image format, the second format is a panorama image format or a wide-view image format, and the first format is different from the second format, where the panorama image is an effect image stitched by multiple images that are shot from different directions by simulating a shooting subject standing in a specific position, and the wide-view image is an effect image stitched by multiple sub-images of a side that are shot by simulating a shooting subject moving along a track.

In an embodiment of the present invention, the input/output device 904 includes a text input device such as a keyboard, a touchscreen, and a mouse; a camera; a touch function module; and the like. The processor coupled to the memory is further configured to invoke a program or the data in the memory, so as to: control the camera to collect an image of a first object, where the first object is a part of a human body; and control the touch function module to apply the touch signal to the first object.

Persons skilled in the art may understand that the accompanying drawings are merely schematic diagrams of exemplary embodiments, and modules or processes in the accompanying drawings are not necessarily required for implementing the present invention.

Persons skilled in the art may understand that the modules in the apparatuses provided in the embodiments may be arranged in the apparatuses in a distributed manner according to the description of the embodiments, or may be arranged in one or more apparatuses that are different from those described in the embodiments. The modules in the foregoing embodiments may be combined into one module, or split into a plurality of submodules.

Persons of ordinary skill in the art may understand that all or a part of the steps of the methods in the embodiments may be implemented by a program instructing relevant hardware.

The program may be stored in a computer readable storage medium, including a ROM/RAM, a magnetic disc, an optical disc, or the like.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An image switching method, wherein the method comprises:
    displaying an image in a first format;
    receiving an input instruction for switching the image from the first format to a second format; and
    displaying the image in the second format, wherein the first format is a panorama image format or a wide-view image format, the second format is a panorama image format or a wide-view image format, and the first format is different from the second format, wherein a panorama image is an effect image stitched by multiple images that are shot from different directions by simulating a shooting subject standing in a specific position, and a wide-view image is an effect image stitched by multiple sub-images of a side that are shot by simulating a shooting subject moving along a track,
    wherein before the receiving an input instruction for switching the image from the first format to the second format, the method further comprises presenting an input identifier of a switching instruction for switching from the first format to the second format, wherein the receiving an input instruction for switching the image from the first format to the second format comprises receiving a selecting operation on the input identifier of the switching instruction, and
    wherein the presenting the input identifier of the switching instruction for switching from the first format to the second format comprises determining an eyesight-gaze position of a user or an operating focus in relation to the image.

2. The method according to claim 1, before the presenting the input identifier of the switching instruction for switching from the first format to the second format, the method further comprises: predicting whether a user is willing to switch the image from the first format to the second format;
    wherein the presenting an input identifier of a switching instruction for switching from the first format to the second format comprises:
    if it is predicted that a user is willing to switch the image from the first format to the second format, presenting the input identifier of the switching instruction for switching from the first format to the second format.

3. The method according to claim 1, wherein the wide-view image is an effect image stitched by multiple sub-images, of one side of a road, that are shot by simulating a shooting subject moving along the road.

4. The method according to claim 3, wherein the determining the eyesight-gaze position of the user or the operating focus in relation to the image comprises:
    detecting that an eyesight gaze position of the user moves in a street side direction, or the operating focus moves in a street side direction; and
    presenting the input identifier of the switching instruction for switching from the first format to the second format, wherein the first format is the panorama image format, and the second format is the wide-view image format.

5. The method according to claim 1, wherein the wide-view image is an effect image stitched by multiple sub-images, of a side of an object, that are shot by simulating a shooting subject moving around the object.

6. The method according to claim 5, wherein the determining the eyesight-gaze position of the user or the operating focus in relation to the image comprises:
    determining a time for which the eyesight-gaze position of the user stays on an object of the image exceeds a preset time, or a time for which an operating focus stays on an object of the image exceeds a preset time; and
    presenting the input identifier of the switching instruction for switching from the first format to the second format, wherein the first format is the panorama image format, and the second format is the wide-view image format.

7. The method according to claim 2, wherein the presenting an input identifier of a switching instruction for switching from the first format to the second format comprises:
    identifying content of the displayed image to indicate that the displayed image is an object; and presenting an input identifier of a switching instruction for switching from the first format to a wide-view image of the object.

8. The method according to claim 1, wherein the presenting an input identifier of a switching instruction for switching from the first format to the second format comprises:
    presenting an icon of the switching instruction for switching from the first format to the second format; and
    the receiving an input instruction for switching the image from the first format to a second format comprises: receiving a click operation on the icon of the switching instruction.

9. The method according to claim 1, wherein the presenting an input identifier of a switching instruction for switching from the first format to the second format comprises:
    presenting a text prompt for switching from the first format to the second format; and the receiving an input instruction for switching the image from the first format to a second format comprises: receiving a click operation on the text prompt.

10. The method according to claim 1, wherein the presenting an input identifier of a switching instruction for switching from the first format to the second format comprises: presenting a menu option for switching from the first format to the second format; and the receiving an input instruction for switching the image from the first format to a second format comprises: receiving a click operation on the menu option.

11. The method according to claim 1, wherein the receiving an input instruction for switching the image from the first format to a second format comprises: receiving a gesture instruction for switching the image from the first format to the second format.

12. The method according to claim 1, wherein the receiving an input instruction for switching the image from the first format to a second format comprises: receiving a voice instruction for switching the image from the first format to the second format.

13. An image switching apparatus, wherein the apparatus comprises: a display; and a processor, wherein the display is configured to display an image in a first format, the processor is configured to receive an input instruction for switching the image from the first format to a second format, and the display is further configured to display the image in the second format, wherein the first format is a panorama image format or a wide-view image format, the second format is a panorama image format or a wide-view image format, and the first format is different from the second format, wherein a panorama image is an effect image stitched by multiple images that are shot from different directions by simulating a shooting subject standing in a specific position, and a wide-view image is an effect image stitched by multiple sub-images of a side that are shot by simulating a shooting subject moving along a track, wherein the processor is further configured to predict that a user is willing to switch from the first format to the second format based on an eyesight-gaze position of a user or an operating focus in relation to the image.

14. The apparatus according to claim 13, wherein before the input instruction for switching the image from the first format to the second format is received, the processor is further configured to:
present an input identifier of a switching instruction for switching from the first format to the second format; and
receive a selecting operation on the input identifier of the switching instruction.

15. The apparatus according to claim 14, wherein before the input identifier of the switching instruction for switching from the first format to the second format is presented, the processor is further configured to predict whether a user is willing to switch the image from the first format to the second format, and if it is predicted that the user is willing to switch the image from the first format to the second format, the processor is further configured to present the input identifier of the switching instruction for switching from the first format to the second format.

16. The apparatus according to claim 13, wherein the wide-view image is an effect image stitched by multiple sub-images, of one side of a road, that are shot by simulating a shooting subject moving along the road.

17. The apparatus according to claim 16, wherein if the eyesight-gaze position of the user moves in a street side direction, or an operating focus moves in the street side direction, the processor is further configured to predict that the user is willing to switch the image from the first format to the second format, wherein the first format is the panorama image format, and the second format is the wide-view image format.

18. The apparatus according to claim 13, wherein the wide-view image is an effect image stitched by multiple sub-images, of a side of an object, that are shot by simulating a shooting subject moving around the object.

19. The apparatus according to claim 18, wherein if a time for which the eyesight-gaze position of the user stays on an object of the image exceeds a preset time, or a time for which an operating focus stays on an object of the image exceeds a preset time, the processor is further configured to predict that the user is willing to switch the image from the first format to the second format, wherein the first format is the panorama image format, and the second format is the wide-view image format.

20. The apparatus according to claim 15, wherein the processor is further configured to identify content of the displayed image, so as to predict that the user is willing to switch the image from the first format to the second format.

21. The apparatus according to claim 14, wherein the processor is further configured to:
present an icon of the switching instruction for switching from the first format to the second format; and
receive a click operation on the icon of the switching instruction.

22. The apparatus according to claim 14, wherein the processor is further configured to:
present a text prompt for switching from the first format to the second forma; and
receive a click operation on the text prompt.

23. The apparatus according to claim 13, wherein the processor is further configured to:
present a menu option for switching from the first format to the second format; and
receive a click operation on the menu option.

24. The apparatus according to claim 13, wherein the processor is further configured to receive a gesture instruction for switching the image from the first format to the second format.

25. The apparatus according to claim 13, wherein the processor is further configured to receive a voice instruction for switching the image from the first format to the second format.

* * * * *

UNITED STATES PATENT AND TRADEMARK OFFICE
CERTIFICATE OF CORRECTION

PATENT NO. : 10,032,248 B2
APPLICATION NO. : 14/984854
DATED : July 24, 2018
INVENTOR(S) : Huang et al.

Page 1 of 1

It is certified that error appears in the above-identified patent and that said Letters Patent is hereby corrected as shown below:

Column 16, Line 29, "forma;" should read -- format; --.

Signed and Sealed this
Twenty-third Day of October, 2018

Andrei Iancu
*Director of the United States Patent and Trademark Office*